US012682262B2

(12) United States Patent
Shimizu

(10) Patent No.: US 12,682,262 B2
(45) Date of Patent: Jul. 14, 2026

(54) FAULT TREE GENERATION DEVICE AND FAULT TREE GENERATION METHOD

(71) Applicant: Hitachi, Ltd., Tokyo (JP)

(72) Inventor: Yuuki Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 580 days.

(21) Appl. No.: 18/206,374

(22) Filed: Jun. 6, 2023

(65) Prior Publication Data

US 2024/0104409 A1 Mar. 28, 2024

(30) Foreign Application Priority Data

Sep. 26, 2022 (JP) ................................. 2022-152949

(51) Int. Cl.
*G06N 5/045* (2023.01)
(52) U.S. Cl.
CPC .................................... *G06N 5/045* (2013.01)
(58) Field of Classification Search
CPC .................................................... G06N 5/045
USPC .......................................................... 706/45
See application file for complete search history.

(56) References Cited

U.S. PATENT DOCUMENTS

| | | | | |
|---|---|---|---|---|
| 2007/0150772 A1* | 6/2007 | Berenbach | .......... | G06F 11/2257 |
| | | | | 714/25 |
| 2023/0082534 A1 | 3/2023 | Yoshitake | | |
| 2023/0297094 A1 | 9/2023 | Shimizu | | |

FOREIGN PATENT DOCUMENTS

| | | | | | |
|---|---|---|---|---|---|
| CN | 105426680 A | * | 3/2016 | ............. | G16Z 99/00 |
| JP | 7-262019 A | | 10/1995 | | |
| JP | 2022-47828 A | | 3/2022 | | |
| WO | WO 2021/166728 A1 | | 8/2021 | | |

OTHER PUBLICATIONS

English Translation of CN-105426680 A (Year: 2016).*
Japanese-language Office Action issued in Japanese Application No. 2022-152949 dated Dec. 23, 2025, with English translation (13 pages).

* cited by examiner

*Primary Examiner* — Nasser M Goodarzi
(74) *Attorney, Agent, or Firm* — Crowell & Moring LLP

(57) ABSTRACT

A fault tree in which causes for failure events are appropriately developed is generated. A fault tree generation device according to the present invention includes a formula database that stores formulas related to physical phenomena, a formula base causal model generation unit that generates a causal relationship of failure events based on the formulas, a formula base fault tree generation unit that generates a formula base fault tree that is a combination of the causal relationships of the failure events, and an output unit that outputs the formula base fault tree.

6 Claims, 12 Drawing Sheets

| ID | PRODUCTS AND PARTS | VARIABLES ON LEFT SIDE (OBJECTIVE VARIABLE) | VARIABLES ON RIGHT SIDE (EXPLANATORY VARIABLE) |
|---|---|---|---|
| 1 | SHAFT AND CYLINDER FASTENERS 205 | SHAFT: FRICTIONAL FORCE 206 | BETWEEN CYLINDER AND SHAFT: FRICTION COEFFICIENT, BETWEEN CYLINDER AND SHAFT: INTERNAL PRESSURE, JUNCTION: AREA, CYLINDER: INNER DIAMETER 207 |
| 2 | SHAFT AND CYLINDER FASTENERS 208 | BETWEEN CYLINDER AND SHAFT : INTERNAL PRESSURE 209 | CYLINDER: INNER DIAMETER, CYLINDER: OUTER DIAMETER, SHAFT: ELASTIC MODULUS SHAFT: TIGHTENING MARGIN 210 |
| 3 | SHAFT AND CYLINDER FASTENERS 211 | JUNCTION: AREA 212 | CYLINDER: INNER DIAMETER, SHAFT: INSERTION LENGTH 213 |
| 4 | .. | .. | .. |
| .. | .. | .. | .. |

Figure 5:
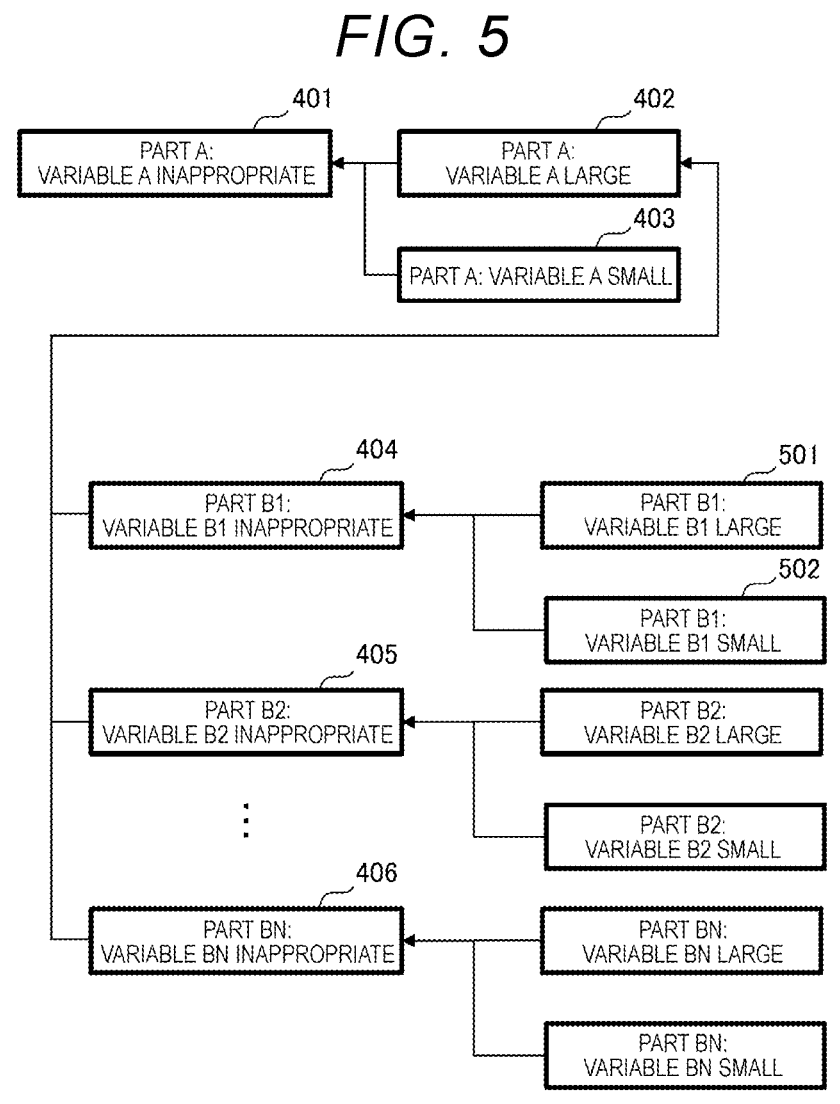

```
                    401                              402
┌──────────────────────────┐      ┌──────────────────────────┐
│        PART A:            │◄─────│        PART A:            │◄───┐
│  VARIABLE A INAPPROPRIATE │      │    VARIABLE A LARGE       │    │
└──────────────────────────┘      └──────────────────────────┘    │
                                                                    │
                                            403                     │
                                   ┌──────────────────────────┐     │
                                   │  PART A: VARIABLE A SMALL │─────┘
                                   └──────────────────────────┘
```

```
              404                              501
┌──────────────────────────┐      ┌──────────────────────────┐
│        PART B1:           │◄─────│        PART B1:           │
│ VARIABLE B1 INAPPROPRIATE │      │    VARIABLE B1 LARGE      │
└──────────────────────────┘      └──────────────────────────┘
                                            502
                                   ┌──────────────────────────┐
                                   │        PART B1:           │
                                   │    VARIABLE B1 SMALL      │
                                   └──────────────────────────┘

405
┌──────────────────────────┐      ┌──────────────────────────┐
│        PART B2:           │◄─────│        PART B2:           │
│ VARIABLE B2 INAPPROPRIATE │      │    VARIABLE B2 LARGE      │
└──────────────────────────┘      └──────────────────────────┘
           ⋮                       ┌──────────────────────────┐
                                   │        PART B2:           │
                                   │    VARIABLE B2 SMALL      │
                                   └──────────────────────────┘
              406
┌──────────────────────────┐      ┌──────────────────────────┐
│        PART BN:           │◄─────│        PART BN:           │
│ VARIABLE BN INAPPROPRIATE │      │    VARIABLE BN LARGE      │
└──────────────────────────┘      └──────────────────────────┘
                                   ┌──────────────────────────┐
                                   │        PART BN:           │
                                   │    VARIABLE BN SMALL      │
                                   └──────────────────────────┘
```

FIG. 7

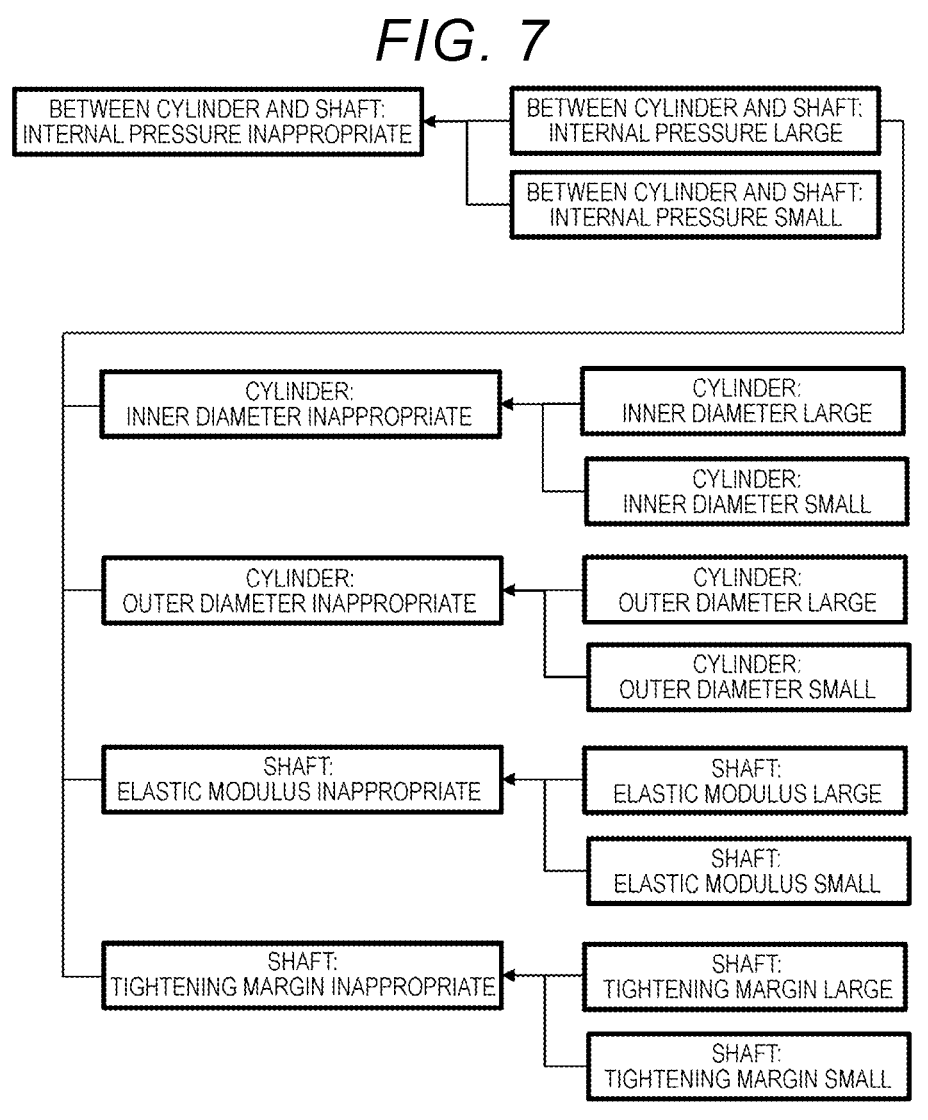

```
┌─────────────────────────────┐       ┌─────────────────────────────┐
│ BETWEEN CYLINDER AND SHAFT: │◄──────│ BETWEEN CYLINDER AND SHAFT: │
│ INTERNAL PRESSURE INAPPROPRIATE │    │ INTERNAL PRESSURE LARGE     │
└─────────────────────────────┘       └─────────────────────────────┘
                                       ┌─────────────────────────────┐
                                       │ BETWEEN CYLINDER AND SHAFT: │
                                       │ INTERNAL PRESSURE SMALL     │
                                       └─────────────────────────────┘
```

```
┌─────────────────────────────┐       ┌─────────────────────────────┐
│ CYLINDER:                   │◄──────│ CYLINDER:                   │
│ INNER DIAMETER INAPPROPRIATE │      │ INNER DIAMETER LARGE        │
└─────────────────────────────┘       └─────────────────────────────┘
                                       ┌─────────────────────────────┐
                                       │ CYLINDER:                   │
                                       │ INNER DIAMETER SMALL        │
                                       └─────────────────────────────┘

┌─────────────────────────────┐       ┌─────────────────────────────┐
│ CYLINDER:                   │◄──────│ CYLINDER:                   │
│ OUTER DIAMETER INAPPROPRIATE │      │ OUTER DIAMETER LARGE        │
└─────────────────────────────┘       └─────────────────────────────┘
                                       ┌─────────────────────────────┐
                                       │ CYLINDER:                   │
                                       │ OUTER DIAMETER SMALL        │
                                       └─────────────────────────────┘

┌─────────────────────────────┐       ┌─────────────────────────────┐
│ SHAFT:                      │◄──────│ SHAFT:                      │
│ ELASTIC MODULUS INAPPROPRIATE │     │ ELASTIC MODULUS LARGE       │
└─────────────────────────────┘       └─────────────────────────────┘
                                       ┌─────────────────────────────┐
                                       │ SHAFT:                      │
                                       │ ELASTIC MODULUS SMALL       │
                                       └─────────────────────────────┘

┌─────────────────────────────┐       ┌─────────────────────────────┐
│ SHAFT:                      │◄──────│ SHAFT:                      │
│ TIGHTENING MARGIN INAPPROPRIATE │   │ TIGHTENING MARGIN LARGE     │
└─────────────────────────────┘       └─────────────────────────────┘
                                       ┌─────────────────────────────┐
                                       │ SHAFT:                      │
                                       │ TIGHTENING MARGIN SMALL     │
                                       └─────────────────────────────┘
```

FAULT TREE GENERATION DEVICE AND FAULT TREE GENERATION METHOD

BACKGROUND OF THE INVENTION

1. Field of the Invention

The present invention relates to a fault tree generation device and a fault tree generation method.

2. Description of Related Art

A method known as fault tree analysis (FTA) is used to investigate causes of a failure event of a product and to identify causes of failures that may occur in a design stage. FTA is an analysis technique that systematically finds out the cause of a failure event by picking up failure events of a product and sequentially identifying and developing the causes of the failures hierarchically.

The result of such analysis has a tree structure in which the failure event of the product is placed at the top and the causes are expanded to the lower hierarchy. Such tree structure is called a fault tree. The failure event of the product positioned at the top of the fault tree is called a top event (upper side origin). In the fault tree, causes that are hierarchically lower than the top event are called intermediate events.

The knowledge information conversion device of JPH07-262019A converts knowledge information in a rule format into knowledge information in a directed graph format.

SUMMARY OF THE INVENTION

When creating a fault tree, it is desirable to properly find the causes of failure events. This is because, when the cause is not found, the failure event cannot be specified, and the investigation of the causes of the failure events takes a long time, which leads to omission of investigation at the design stage. This is also because, when duplication occurs, the same cause will be redundantly investigated, resulting in unnecessary works.

Specifically, the knowledge information conversion device of JPH07-262019A may generate, from the knowledge information in a rule format "IF ignition flag failure-THEN exhaust gas cylinder temperature high", a causal relationship that the cause of "ignition flag failure" is "exhaust gas cylinder temperature high". However, with such technique, it is not possible to determine whether the "exhaust gas cylinder temperature high" is the only cause of the "ignition flag failure", that is, whether the causal relationship is properly developed.

Accordingly, an object of the present invention is to create a fault tree in which the causes of failure events are appropriately developed.

BRIEF DESCRIPTION OF THE DRAWINGS

FIG. 2 is a diagram showing an example of a formula database;

FIG. 3 is a diagram showing an example of a causal model;

FIG. 5 is a diagram provided to explain the formula base causal model generation process;

FIG. 7 shows an example of the formula base causal model;

DESCRIPTION OF EMBODIMENTS

A fault tree generation device according to the present invention includes a formula database that stores formulas related to physical phenomena, a formula base causal model generation unit that generates a causal relationship of failure events based on the formulas, a formula base fault tree generation unit that generates a formula base fault tree that is a combination of the causal relationships of the failure events, and an output unit that outputs the formula base fault tree.

Other means will be described in the embodiments of the invention.

According to the present invention, it is possible to create a fault tree in which causes for failure events are appropriately developed.

First Embodiment (Fault Tree Generation Device)

Figure 1:
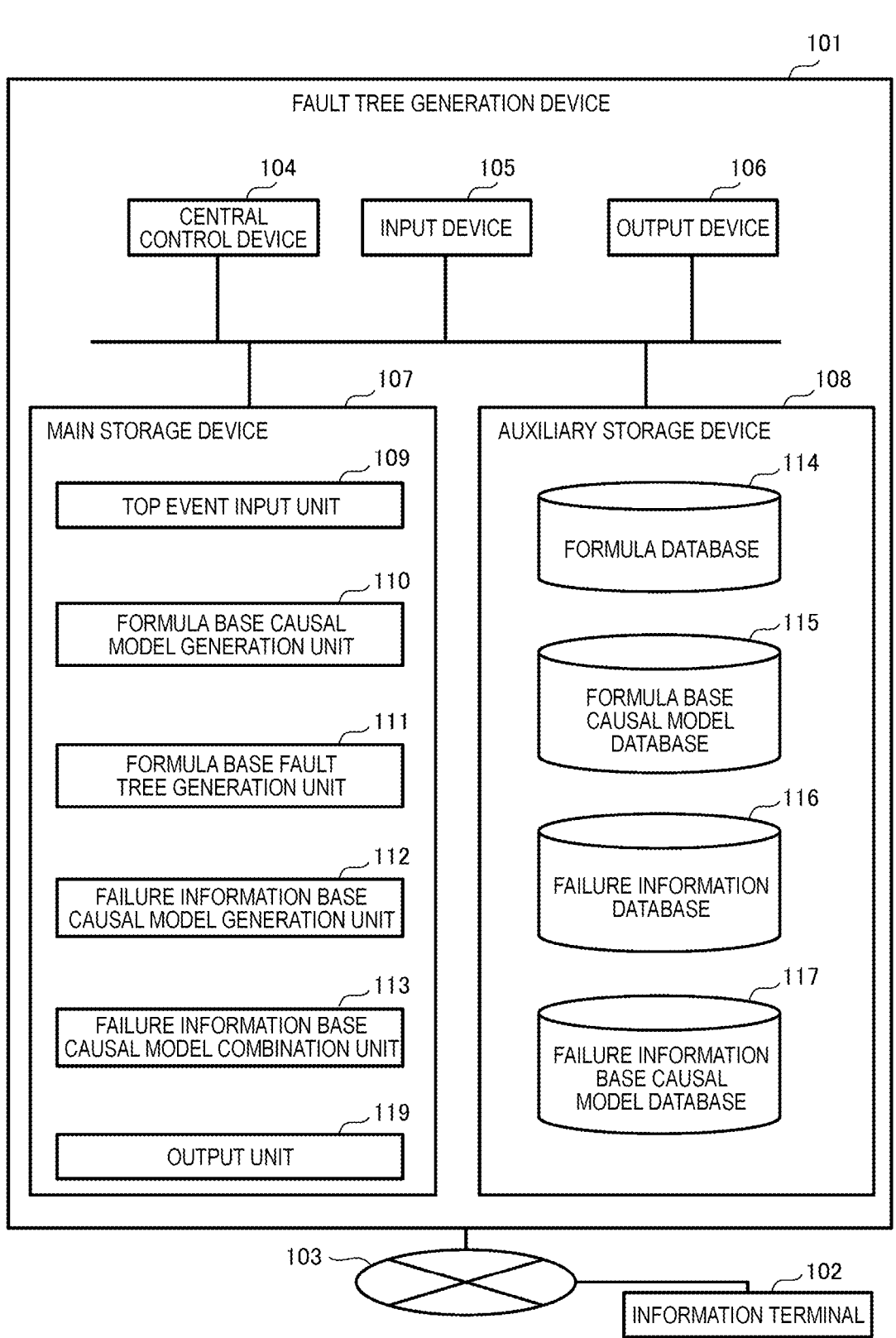
FIG. 1 is a diagram showing a configuration of a fault tree generation device.

FIG. 1 is a diagram provided to explain a configuration of a fault tree generation device 101. There exists the fault tree generation device 101 and an information terminal 102. The fault tree generation device 101 and the information terminal 102 may communicate with each other via a network 103. The fault tree generation device 101 is a general computer and has a central control device 104, an input device 105, an output device 106, a main storage device 107, and an auxiliary storage device 108. The components are connected to each other by a bus.

The main storage device 107 includes a top event input unit 109, a formula base causal model generation unit 110, a formula base fault tree generation unit 111, a failure information base causal model generation unit 112, a failure information base causal model combination unit 113, and an output unit 119, which are implemented as programs. Hereinafter, when it is described that a certain unit performs a function, it means that the central control device 104 reads each program from the auxiliary storage device 108, loads the read program into the main storage device 107, and then performs the function of each program (details will be described below).

The top event input unit 109 receives a user input of a top event.

A formula database 114 stores formulas.

The formula base causal model generation unit 110 generates a causal relationship from a relationship between variables on left and right sides of the formulas stored in the formula database 114. The causal relationship generated by the formula base causal model generation unit 110 is referred to as a formula base causal model.

The formula base causal model generation unit 110 stores the formula base causal model in a formula base causal model database 115. Details of the process of the formula base causal model generation unit 110 and the form of formula base causal model will be described below.

The formula base fault tree generation unit 111 retrieves, from the formula base causal model database 115, a formula base causal model related to the top event received by the top event input unit 109, and combines the causal relationships as the retrieved results to generate a formula base fault tree.

A failure information database 116 stores failure information.

The failure information base causal model generation unit 112 uses natural language process to extract the causal relationships of the failure events described in the failure information stored in the failure information database 116, and generates a failure information base causal model. Examples of the failure information include information including a failure event expressed in a sentence.

The failure information base causal model generation unit 112 stores the failure information base causal model in a failure information base causal model database 117.

The failure information base causal model combination unit 113 combines the failure information base causal model stored in the failure information base causal model database 117 with the formula base fault tree generated by the formula base fault tree generation unit 111, and outputs the combined result.

The output unit 119 outputs various information including the formula base fault tree to the output device 106.

The information terminal 102 is also a general computer, and includes a central control device, an input device, an output device, a main storage device and an auxiliary storage device (not shown), like the fault tree generation device 101. When the user cannot directly operate the fault tree generation device 101, the user may use the information terminal 102 to remotely operate the fault tree generation device 101 via the network 108.

(Formula Database)

FIG. 2 is a diagram showing an example of the formula database 114. The formula database 114 stores, in association with identifiers (IDs) stored in an ID column 201, products and parts in a Product And Part column 202, variables on the left side in a Variables On Left Side column 203, and variables on the right side in a Variables On Right Side column 204.

The ID in the ID column 201 is an identifier that uniquely identifies a formula. The numbers "1", "2", "3" and so on indicated as IDs specify the formula Nos. (1), (2), (3) and so on.

The products and parts in the Product And Part column 202 refer to the products or parts to which formula is applied.

The variables on the left side of the Variables On Left Side column 203 are the variables (objective variables) on the left side of the formula.

The variables on the right side of the Variables On Right Side column 204 are the variables (explanatory variables) on the right side of the formula.

For example, in the case of a part that is fastened by press-fitting a shaft into a cylinder, the frictional force "F" generated on the shaft is obtained by Formula (1).

[Formula 1]

$$F = \mu P A \frac{d_1}{2} \tag{1}$$

"μ" is a friction coefficient between the cylinder and the shaft. "P" is an internal pressure between the cylinder and the shaft. "A" is an area of a junction. "$d_1$" is an inner diameter of the cylinder.

For the information related to Formula (1), the formula database 114 stores, in the first row thereof, "shaft and cylinder fastening part" 205 in the Product And Part column 202, "shaft: frictional force" 206 in the Variables On Left Side column 203, and "between cylinder and shaft: friction coefficient, between cylinder and shaft: internal pressure, junction: area, cylinder: inner diameter" 207 in the Variables On Right Side column 204.

The variables on the left side and the variables on the right side are stored as a set including target parts and variables in a format such as "part: variable". For example, the variable "friction coefficient between cylinder and shaft" on the right side is stored in a format such as "between cylinder and shaft: friction coefficient". When there are multiple variables on the right side, each variable on the right side is separated by "," and stored.

The internal pressure "P" between the cylinder and the shaft is obtained by Formula (2).

[Formula 2]

$$P = \frac{d_2^2 - d_1^2}{2 d_1 d_2} E \Delta \tag{2}$$

"$d_1$" is the inner diameter of the cylinder. "$d_2$" is an outer diameter of the cylinder. "$\Delta$" is an elastic modulus of the shaft. "$\Delta$" is a tightening margin of the shaft.

For the information related to Formula (2), the formula database 114 stores, in the second row thereof, "fastening part between shaft and cylinder" 208 in the Product And Part column 202, "between cylinder and shaft: internal pressure" 209 in the Variables On Left Side column 203, and "cylinder: inner diameter, cylinder: outer diameter, shaft: elastic modulus, shaft: tightening margin" 210 in the Variables On Right Side column 204.

The area "A" of the junction is determined by Formula (3).

[Formula 3]

$$A = \pi d_1 L \tag{3}$$

"$d_1$" is the inner diameter of the cylinder. "L" is an insertion length of the shaft.

For the information related to Formula (3), the formula database 114 (FIG. 2) stores, in the third row thereof, "fastening part between shaft and cylinder" 211 in the Product And Part column 202, "junction: area" 212 in the Variables On Left Side column 203, and "cylinder: inner diameter, shaft: insertion length" 213 in the Variables On Right Side column 204.

(Formulas and Variables)

The formulas of the first embodiment are formulas relating to physical phenomena. It may be said that the formulas express the law of nature that is guaranteed and proven to always hold true. In general, products are designed and operated using such formulas. The formula herein may be an equation or an inequation. The formula includes a plurality of variables. In general, the formula may be modified without changing content thereof. The variables and numbers thereof included in the left side change, and the variables and numbers thereof included in the right side also change according to a transformation method.

For the sake of clarity, it is assumed that the formula of the first embodiment includes one variable on the left side and one or a plurality of variables on the right side, like Formulas (1) to (3). The variables included in the left side (variables on the left side) are also referred to as "objective variables", and variables included in the right side (variables on the right side) are also referred to as "explanatory variables". The explanatory variables correspond to the cause of the causal relationship, and the objective variables correspond to the result of the causal relationship. The objective variables and the explanatory variables are any physical quantities exhibited by the product.

(Prevention of Omission and Duplication of Failure Events)

Looking at Formulas (1) to (3), one can readily notice the presence of all objective variables and all explanatory variables. For example, in Formula (1), it is usually impossible to notice the presence of "p" and "P" without noticing the presence of "A" and "$d_1$" which is one of the explanatory variables in Formula (1), is the objective variable in Formula (2). Likewise, "A", which is the another explanatory variable in Formula (1) is the objective variable in Formula (3). That is, "P" and "A" are included in the hierarchy immediately below F'''. Omission and duplication of failure events in the same layer is prevented. Therefore, the output unit 119 may output Formulas (1) to (3) to the output device 106 or the information terminal 102 to prompt the user to confirm that there is no omission or duplication of failure events.

(Causal Model)

The formula base causal model generation unit 110 generates a formula base causal model based on the relationship between the objective variables and the explanatory variables of the formulas stored in the formula database 114. The failure information base causal model generation unit 112 uses natural language process to extract the causal relationships of the failure events described in the failure information stored in the failure information database 116, and generates a failure information base causal model. The causal model herein is a model of a causal relationship.

Figure 3:
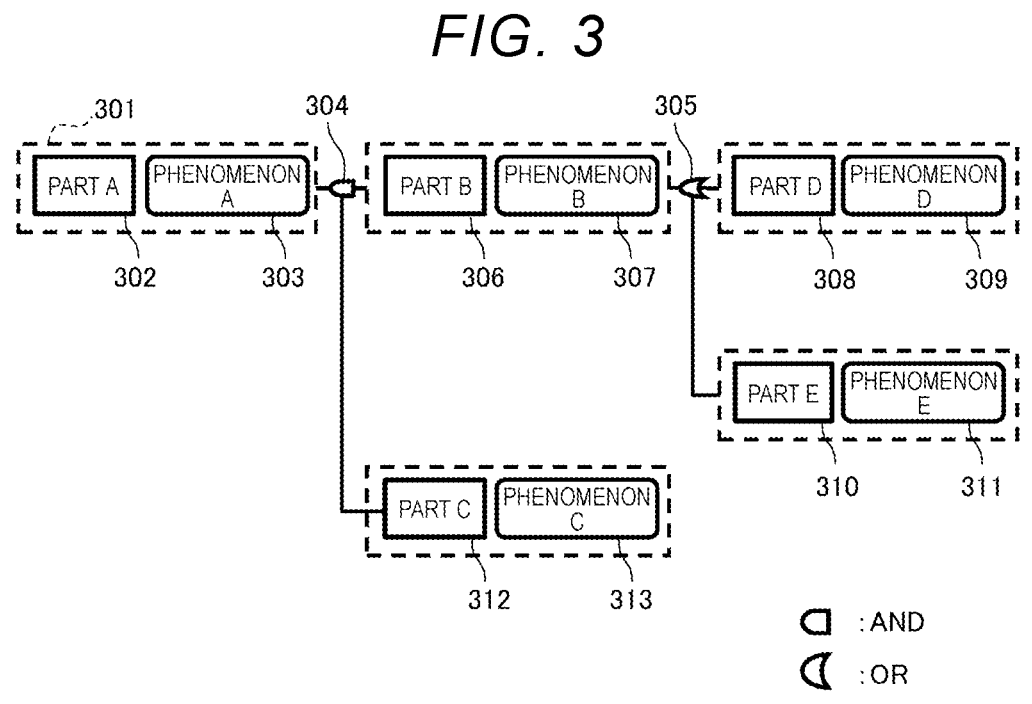

FIG. 3 is a diagram showing an example of a causal model. Individual elements (for example, reference numeral 301) in the causal model are events that include parts (for example, reference numeral 302) and phenomena (for example, reference numeral 303). Since the "events" that occur in the real world are represented by the "elements" in the causal model, the first embodiment uses both "events" and "elements", but both essentially have the same meaning. The elements are represented in a chain in the order of causal relationship. In the example of FIG. 3, the right element (cause) causes the left element (effect). There are an AND condition 304 and an OR condition 305 as relations connecting the elements. The AND condition 304 indicates that the left element is triggered when all of the concatenated elements occur. The OR condition 305 indicates that the left element is triggered when at least one of the concatenated elements occurs.

In the example of FIG. 3, when a phenomenon D309 occurs in a part D308 or a phenomenon E311 occurs in a part E310, a phenomenon B307 occurs in a part B306. When the phenomenon B307 occurs in the part B306 and a phenomenon C313 occurs in a part C312, a phenomenon A303 occurs in a part A302.

A causal model generated from the formula is referred to as a formula base causal model, and a causal model generated from the causal relationship of failure events described in the failure information is referred to as a failure information base causal model.

(Formula Base Causal Model Generation Process)

Figure 4A:
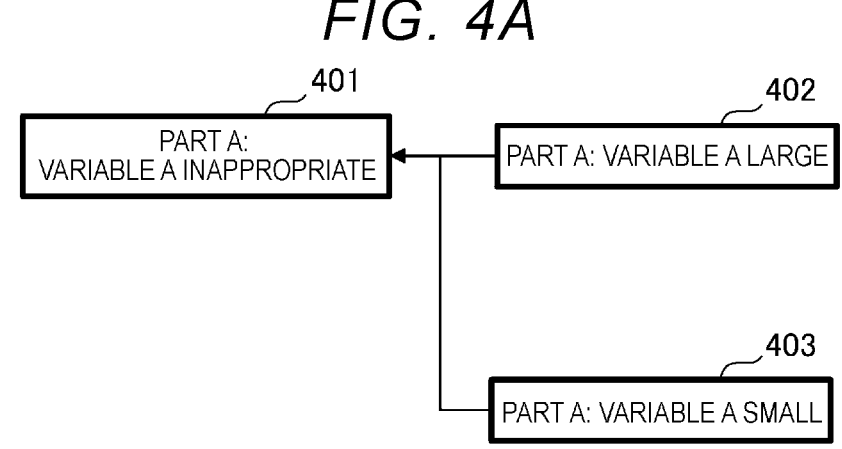
FIG. 4A is a diagram provided to explain a formula base causal model generation process.
Figure 4B:
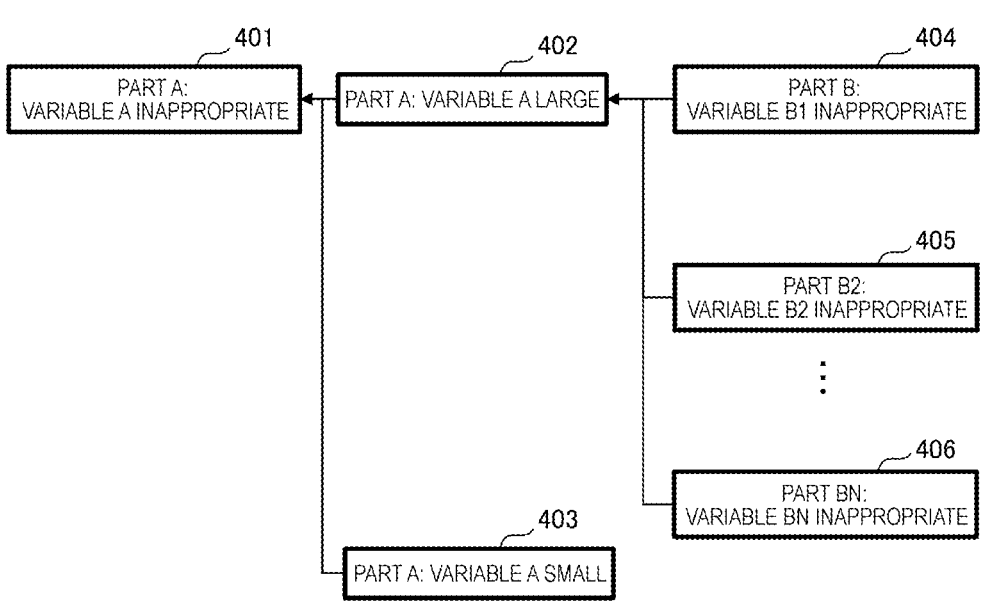
FIG. 4B is a diagram provided to explain the formula base causal model generation process.

The formula base causal model generation unit 110 generates a formula base causal model based on the relationship between the objective variables and the explanatory variables of the formulas stored in the formula database 114. The process includes the following three steps. Referring to FIGS. 4A, 4B and 5, the steps will be described.

(Step 1)

The formula base causal model generation unit 110 generates an inappropriateness of the objective variable as a failure event, and also generates, as its causes, an element with a large objective variable and an element with a small objective variable. Specifically, the formula base causal model generation unit 110 adds a string "inappropriate" to the objective variable "part A: variable A" as shown in FIG. 4A to make "part A: variable A inappropriate" 401 in Formula (4) described below, for example. Each variable in Formula (4) is expressed in the form of "part: variable". For example, the left side of Formula (1) is expressed in the form of "shaft: frictional force".

Each of the variables (objective variables and explanatory variables) has a "normal range" within which the product operates normally. The normal range is a range between any upper limit reference value and any lower limit reference value in the range of physical quantities that the product can exhibit. When the value of the variable is out of the normal range, a failure event occurs in the product. The value of the variable is out of the normal range when the value of the variable is greater than the upper limit reference value of the normal range, and when the value of the variable is less than the lower limit reference value of the normal range. Therefore, the formula base causal model generation unit 110 adds strings "large" and "small" to "part A: variable A" as the cause of "part A: variable A inappropriate" 401, and generates elements "part A: variable A large" 402 and "part A: variable A small" 403. The formula base causal model generation unit 110 may receive the user's input of the upper limit reference value and the lower limit reference value, or may automatically set the reference values based on the empirical values without receiving the reference values.

[Formula 4]

$$\text{Part } A:\text{Variable } A = f(\text{Part } B1:\text{Variable } B1, \text{Part } B2: \text{Variable } B2, \ldots, \text{Part } BN:\text{Variable } BN) \quad (4)$$

"f" on the right side of Formula (4) represents a function. Formula (4) has one objective variable and N explanatory variables.

(Step 2)

The formula base causal model generation unit 110 regards the cause of the large objective variable and the small objective variable generated in step 1 as a case of the inappropriate explanatory variable, and generates the inappropriate explanatory variable as an element. For example, in the case of Formula (4), as shown in FIG. 4B, the formula base causal model generation unit 110 adds "part B1: variable B1 inappropriate" 404, "part B2: variable B2 inappropriate" 405, "part BN: variable BN inappropriate" 406 to "part A: variable A large" 402 and "part A: variable A small" 403 generated in step 1. In FIG. 4B, descriptions of "part B1: variable B1 inappropriate" 404, "part B2: variable B2 inappropriate" 405, . . . , "part BN: variable BN inappropriate" 406 added to "part A: variable A small" 403 are omitted.

(Step 3)

The formula base causal model generation unit 110 generates elements of large explanatory variables and small explanatory variables as causes of the inappropriate explanatory variables generated in step 2. Here, as in step 1, the variable has a normal range and when the value of the variable is out of that range, a failure event occurs in the product. Then it is determined that the value of the variable is out of the normal range when the value of the variable is greater than the upper limit reference value of the normal range, and when the value of the variable is less than the lower limit reference value of the normal range.

For example, in the case of Formula (4), as shown in FIG. 5, the formula base causal model generation unit 110 adds "part B1: variable B1 large" 501 and "part B1: variable B1 small" 502 and the like to each of "part B1: variable B1 inappropriate" 404, "part B2: variable B2 inappropriate" 405, . . . , "part BN: variable BN inappropriate" 406 generated in step 2. Although omitted in FIG. 5, the same cause as "part A: variable A large" is added to "part A: variable A small".

In steps 1 to 3, the formula base causal model generation unit 110 can generate a formula base causal model when there are objective variables and explanatory variables. In the first embodiment, the formula base causal model generation unit 110 acquires variables from each of the Variables On Left Side column 203 and the Variables On Right Side column 204 of the formula database 114 shown in FIG. 2, and generates a formula base causal model.

For example, when generating a causal model based on Formula (1), the formula base causal model generation unit 110 acquires the "shaft: frictional force" 206 from the Variables On Left Side column 203, and the "between the cylinder and the shaft: Friction coefficient, between cylinder and shaft: internal pressure, junction: area, cylinder: inner diameter" 207 from the Variables On Right Side column 204 to generate a formula base causal model.

Figure 6:
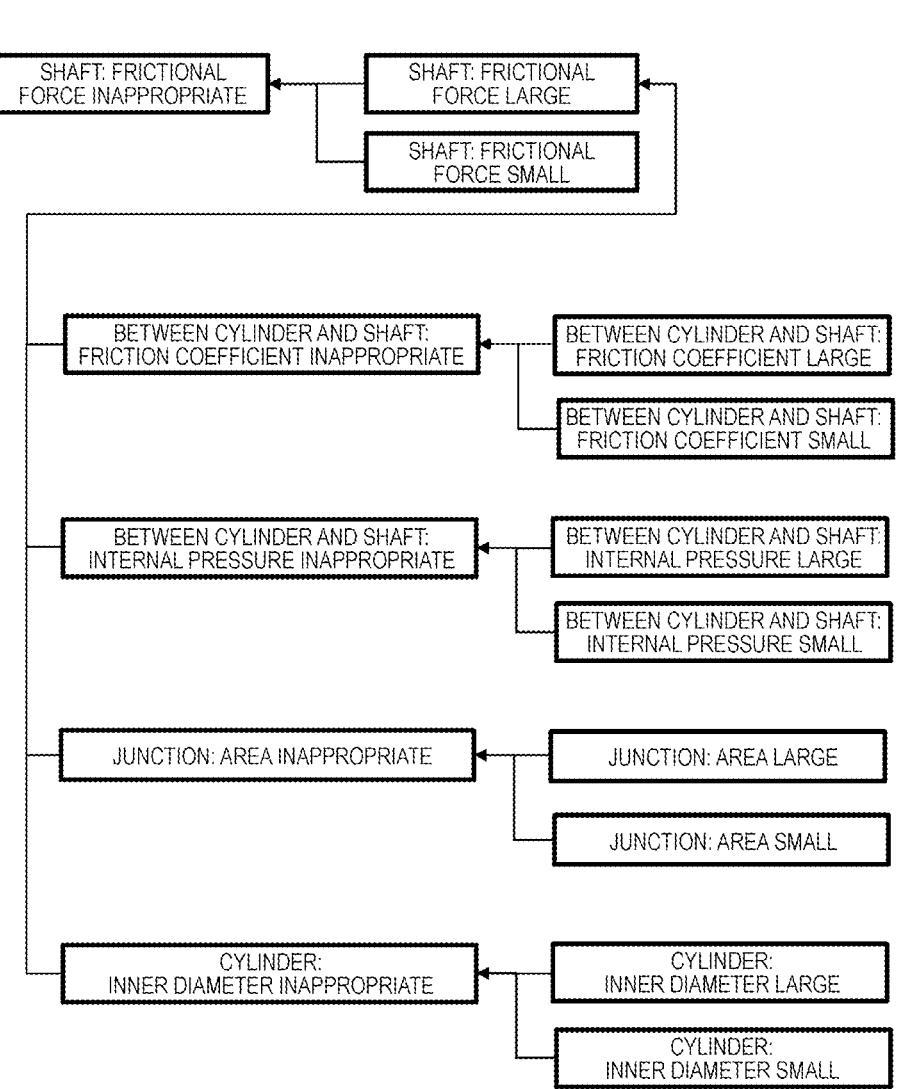
FIG. 6 shows an example of a formula base causal model.
Figure 8:
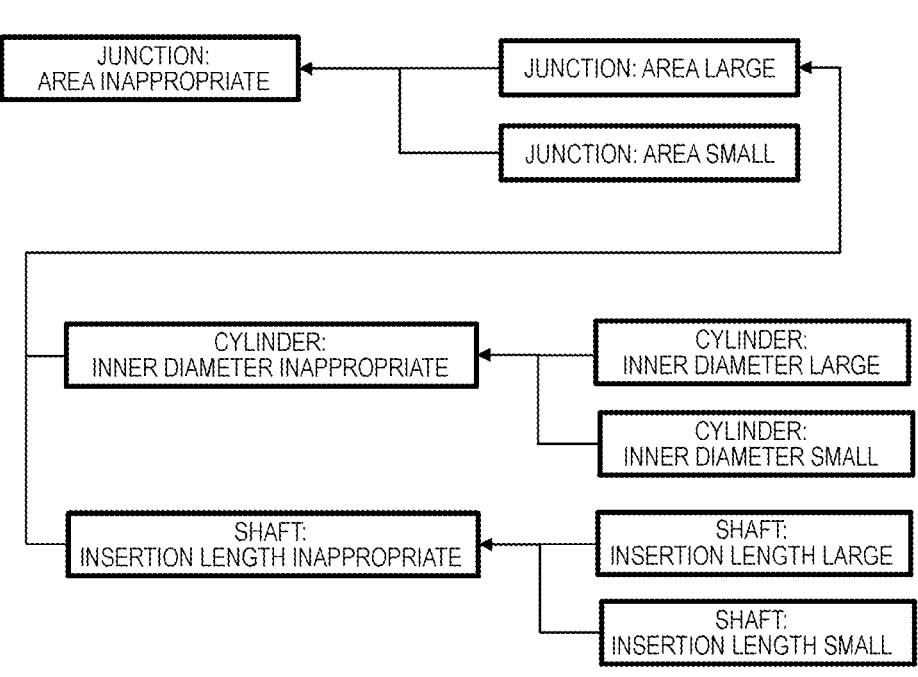
FIG. 8 shows an example of the formula base causal model.

FIGS. 6, 7 and 8 show examples of formula base causal models generated based on Formulas (1), (2) and (3), respectively. The formula base causal model generation unit 110 stores the generated formula base causal model in the formula base causal model database 115.

(Formula Base Fault Tree Generation Process)

The formula base fault tree generation unit 111 retrieves, from the formula base causal model database 115, the formula base causal model related to the top event received by the top event input unit 109. The formula base fault tree generation unit 111 combines a plurality of formula base causal models retrieved as a result to generate a formula base fault tree.

For example, when the top event input unit 109 receives "shaft: frictional force inappropriate" as the top event, the formula base fault tree generation unit 111 retrieves a formula base causal model including "shaft: frictional force inappropriate" from the formula base causal model database 115. The result corresponds to the formula base causal model (FIG. 6) generated based on Formula (1).

Next, the formula base fault tree generation unit 111 further retrieves a formula base causal model including the individual elements of this formula base causal model from the formula base causal model database 115. The result of retrieving "between cylinder and shaft: internal pressure large", which is one of the elements of the formula base causal model generated based on Formula (1), corresponds to the formula base causal model (FIG. 7) generated based on Formula (2). The result of retrieving "junction: area large", which is one of the elements of the formula base causal model generated based on Formula (1), corresponds to the formula base causal model (FIG. 8) generated based on Formula (3).

The formula base fault tree generation unit 111 combines the corresponding formula base causal models (FIGS. 7 and

8) with the formula base causal model (FIG. 6) generated based on Formula (1). The formula base fault tree generation unit 111 further retrieves individual elements of the combined formula base causal model, and combines the corresponding formula base causal models, if any. The result generated after repeatedly performing such process is referred to as a formula base fault tree.

Figure 9:
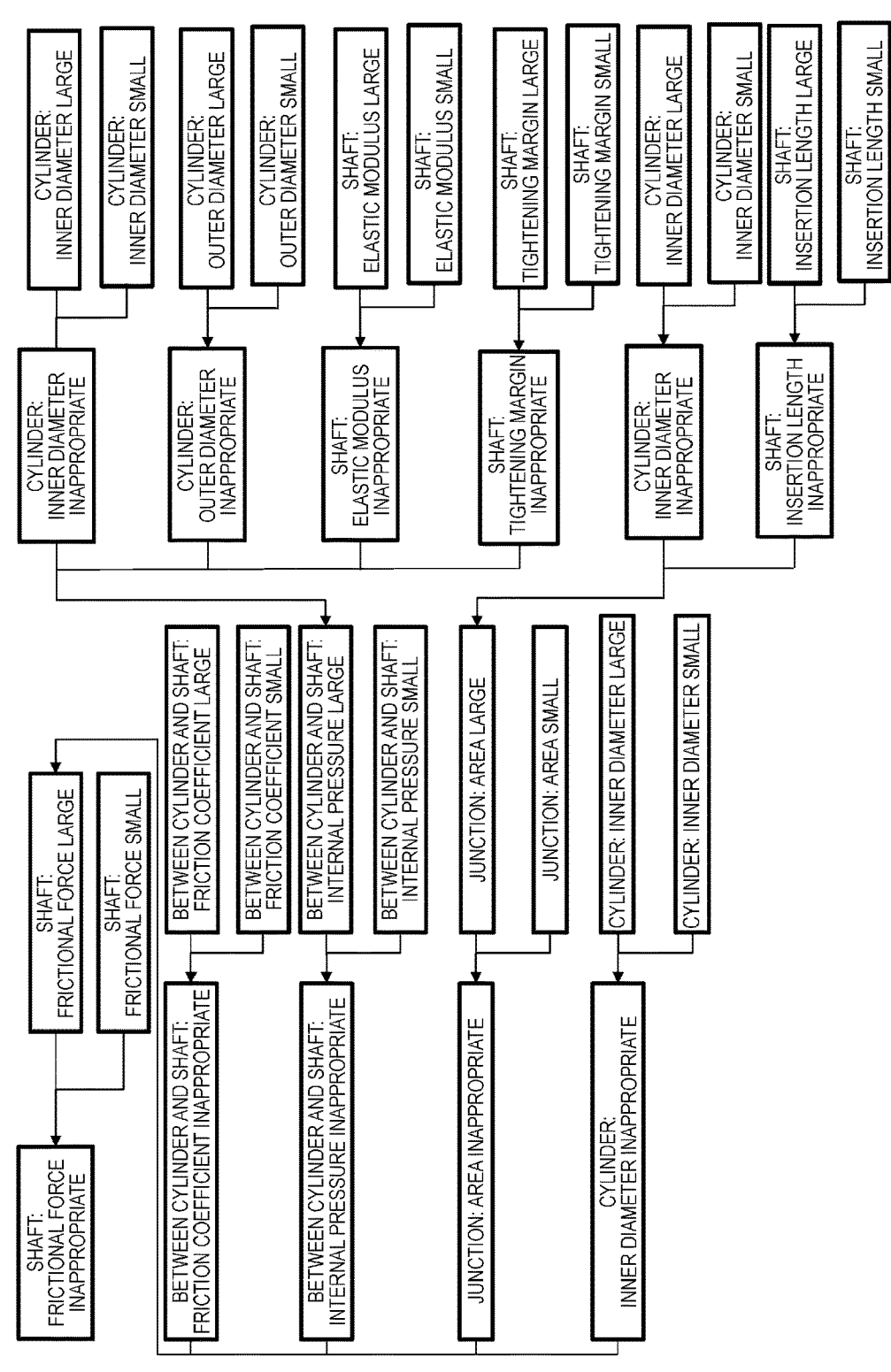
FIG. 9 shows an example of a formula base fault tree.

FIG. 9 shows an example of the formula base fault tree. The formula base fault tree of FIG. 9 is the result of combining the formula base causal model of FIG. 7 and the formula base causal model of FIG. 8 with the formula base causal model of FIG. 6, and expresses resulting event and causative event in terms of magnitudes of physical quantities. With the process described above, a fault tree can be generated for the top event without omission and duplication.

(Failure Information Base Causal Model Generation Process)

The failure information base causal model generation unit 112 uses natural language process to extract causal relationships of the failure events described in the failure information stored in the failure information database 116, and generates a failure information base causal model. The failure information is a sentence describing an actually occurred failure event and cause thereof. For example, sentences such as "friction coefficient between cylinder and shaft is small due to material inappropriate for shaft" and "inner diameter of cylinder is large due to design error of cylinder" are described.

Figure 10:
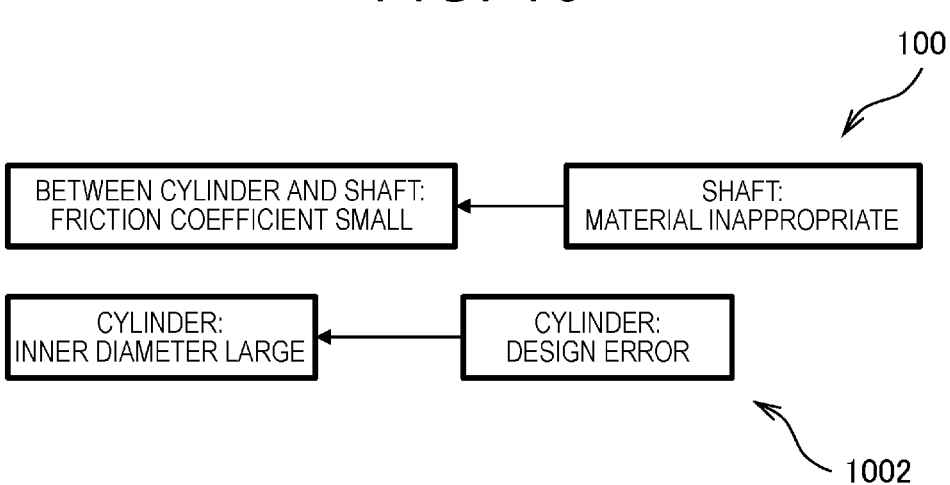
FIG. 10 shows an example of a failure information base causal model.

FIG. 10 shows an example of a failure information base causal model. The failure information base causal model generation unit 112 generates failure information base causal models 1001 and 1002 (FIG. 10) from the failure information by a natural language process. Specifically, the failure information base causal model generation unit 112 extracts parts and phenomena from the natural language sentences, sets a combination of parts and phenomena with a high degree of association among the extraction results as events (elements), and analyzes the causal relationship between the events, thereby placing the events in a causal relationship order.

When the failure information is "friction coefficient between cylinder and shaft is small due to material inappropriate for shaft", the failure information base causal model generation unit 112 extracts, from the sentence of the failure information, "shaft" and "between cylinder and shaft" as the parts, and extracts "material inappropriate" and "friction coefficient small" as the phenomena. The failure information base causal model generation unit 112 may extract the parts and the phenomena by comparing the sentence of the failure information against a dictionary of parts and phenomena prepared in advance.

Then the failure information base causal model generation unit 112 obtains a degree of association based on the number of words between the extracted part and the phenomenon, and combines the part and the phenomenon of a high degree of association. For example, the failure information base causal model generation unit 112 pairs "shaft" and "material inappropriate" as an element, "shaft: material inappropriate", and pairs "between cylinder and shaft" and "friction coefficient small" as an element, "between cylinder and shaft: Friction coefficient small".

Then the failure information base causal model generation unit 112 recognizes that there is a causal relationship in the failure information based on words such as "by" included in the failure information, and generates a failure information base causal model (for example, reference numeral 1001 in FIG. 10). The failure information base causal model generation unit 112 may recognize the causal relationship by comparing the sentence of the failure information against a dictionary of expressions of causal relationship prepared in advance. The failure information base causal model generation unit 112 stores the generated failure information base causal model in the failure information base causal model database 117.

(Failure Information Base Causal Model Combination Process)

The failure information base causal model combination unit 113 combines the failure information base causal model stored in the failure information base causal model database 117 with the formula base fault tree generated by the formula base fault tree generation unit 111, and outputs the combined result.

For example, with the formula base fault tree as shown in FIG. 9, the failure information base causal model combination unit 113 retrieves the failure information base causal model database 117 with the elements included therein, that is, with "between cylinder and shaft: Friction coefficient small" and "cylinder: inner diameter large". Then, the result corresponds to the failure information base causal models 1001 and 1002 of FIG. 10. The failure information base causal model combination unit 113 combines these with formula base fault tree of FIG. 9 to generate a fault tree (FIG. 11).

Figure 11:
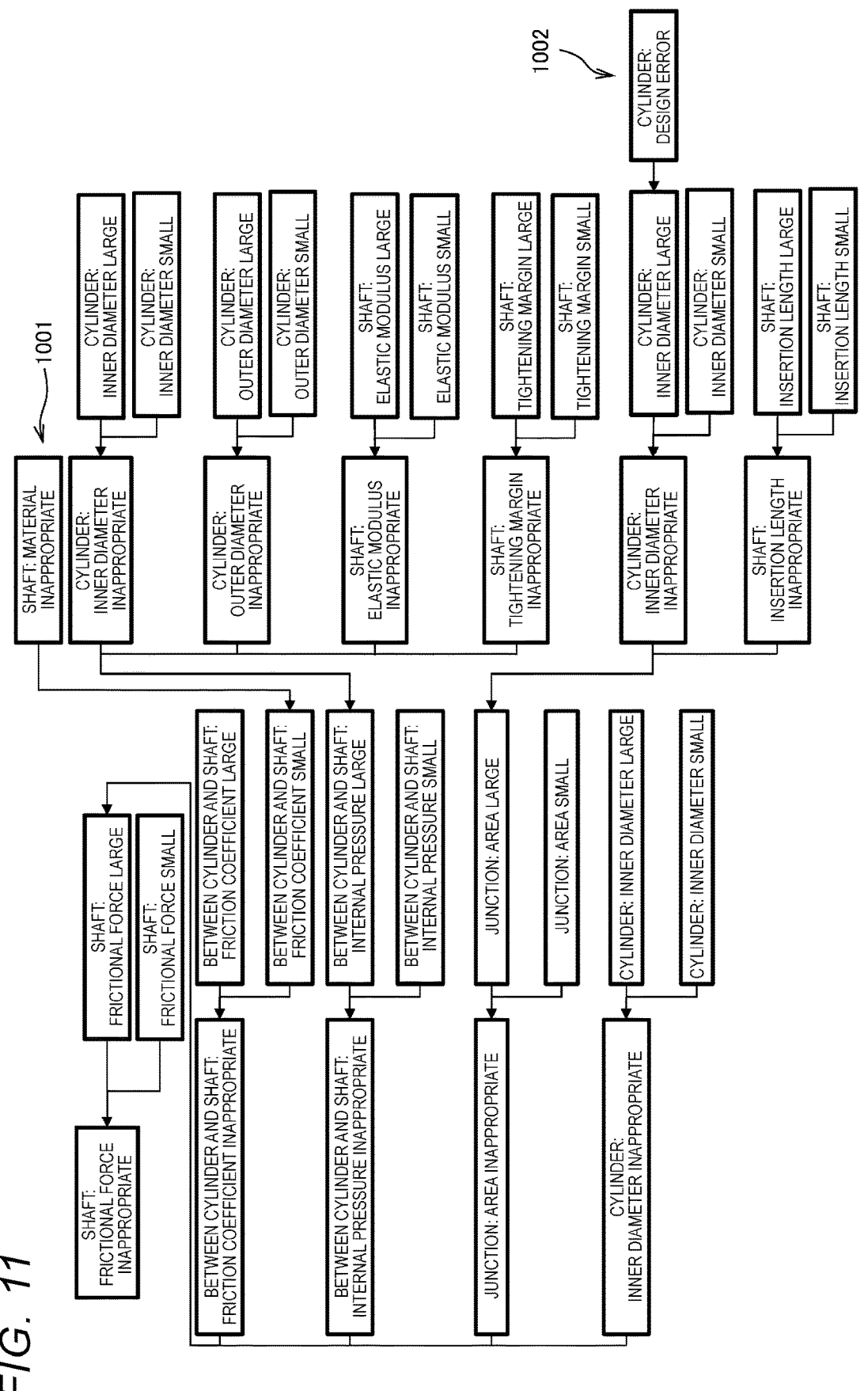
FIG. 11 shows an example of a fault tree.

FIG. 11 shows an example of the fault tree described above.

The output device 106 displays the formula base fault tree (FIG. 9) and the fault tree (FIG. 11) on a screen. By combining the failure information base causal model (FIG. 10) with the formula base fault tree (FIG. 9), it is possible to generate a fault tree including detailed failure events that cannot be expressed by formulas alone. With the process described above, a fault tree can be generated, in which the causes of failure events are developed without omission or duplication.

Second Embodiment (Fault Tree Generation Device)

Figure 12:
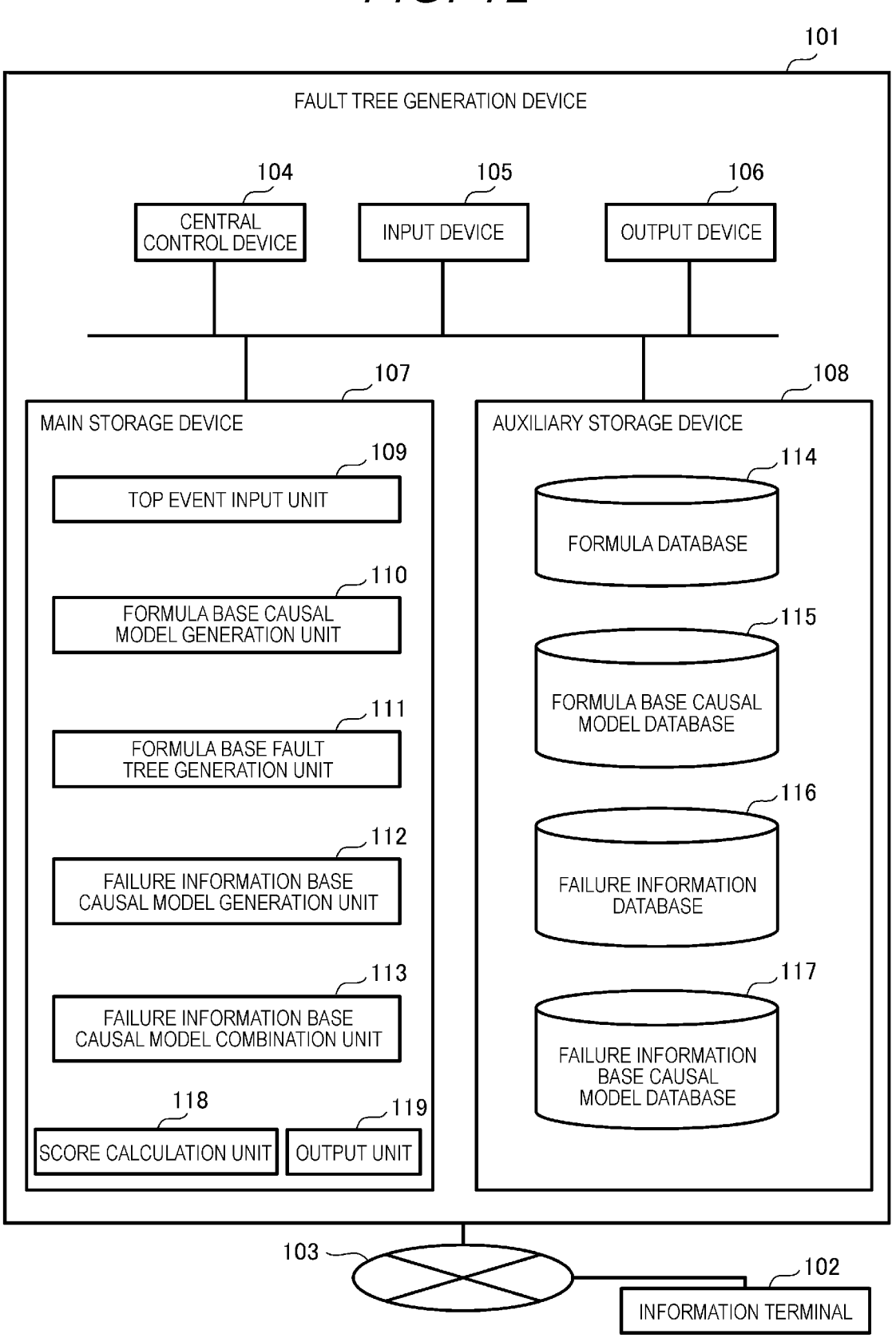
FIG. 12 is a diagram showing a configuration of the fault tree generation device.

FIG. 12 is also a diagram showing a configuration of the fault tree generation device 101.

The configuration of the fault tree generation device 101 of the second embodiment is the same as that of the first embodiment except that a score calculation unit 118 (FIG. 1) is added in the second embodiment. In the second embodiment, the score calculation unit 118 calculates and displays a score for each element of the generated fault tree. The score calculation unit 118 may display the cause of the score that is either large or small with respect to any reference in a specific manner. Displaying in the specific manner includes hiding a cause with a low score (correlation) with respect to any reference, and highlighting a cause with a high score with respect to any reference. There may be two methods for calculating the score, which will be described below.

The first method is a method of using formulas. For example, FIG. 6 shows the result of generating a formula base causal model based on Formula (1). The score calculation unit 118 finally generates two elements, "between cylinder and shaft: Friction coefficient large" and "between cylinder and shaft: Friction coefficient small", as the cause of "shaft: frictional force large".

In Formula (1), when the explanatory variable "between cylinder and shaft: Friction coefficient" increases, the objective variable "shaft: frictional force" increases. Conversely, when the explanatory variable "between cylinder and shaft: Friction coefficient" decreases, the objective variable "shaft: frictional force" decreases. In other words, for the cause of "shaft: frictional force large", "between cylinder and shaft: Friction coefficient large" is more appropriate. Here, the score for "between cylinder and shaft: Friction coefficient large" is greater than the score for "between cylinder and shaft: Friction coefficient small". The score calculation unit 118 thus calculates a score from the effect on the objective variable when the value of the explanatory variable is changed.

The second method is a method of using past results, that is, past failure information. Specifically, the score calculation unit 118 calculates a score based on the number of pieces of failure information that describes both a failure event and an event as a candidate cause of the failure event in the fault tree. The greater the number of cases, the greater the score.

For example, the score calculation unit 118 retrieves the failure information database 116 and obtains the number of pieces of failure information including both "shaft: frictional force large" and "between cylinder and shaft: Friction coefficient large", and the number of pieces of failure information including both "shaft: frictional force large" and "between cylinder and shaft: Friction coefficient small". When there is a larger number of pieces of failure information that include both "shaft: frictional force large" and "between cylinder and shaft: Friction coefficient large", as the cause of "shaft: frictional force large", "between cylinder and shaft: Friction coefficient large" is more appropriate, and specifically speaking, the score is higher.

As can be seen, the score expresses the correlation between the resulting event and causative event of the fault tree. By calculating the score for each element as such, it is possible to delete or invalidate the elements with low scores, for example. The fault tree is prevented from diverging without convergence, making it possible to generate a fault tree including only the elements that are truly meaningful to the user.

The fault tree generation device of the first and second embodiments have the following effects.

(1) The fault tree generation device can generate a fault tree without omission from the formulas including variables that users tend to overlook.

(2) The fault tree generation device can utilize formulas including physical quantities of results and physical quantities of causes as variables.

(3) The fault tree generation device can combine the user's empirical knowledge with the theoretical fault tree generated from the formula.

(4) The fault tree generation device can define the occurrence of a failure event as a case in which the value of a variable is inappropriate.

(5) The fault tree generation device can define inappropriateness of a variable value as a magnitude of a variable value with respect to a predetermined reference.

(6) The fault tree generation device can calculate a utility value of the causal relationship by calculating the correlation between the result and the cause.

Note that the present disclosure is not limited to the embodiments described above, and includes various modifications. For example, the embodiments described above are described in detail to explain the present disclosure in an easy-to-understand manner, and are not necessarily limited to those having all the configurations described above. A part of the configuration of an embodiment may be replaced with the configuration of another embodiment, and the configuration of another embodiment may be added to the configuration of an embodiment. It is possible to add, delete, and replace other configurations for a part of the configuration of each embodiment.

What is claimed is:

1. A fault tree generation device comprising:
a formula database that stores formulas related to physical phenomena;
a formula base causal model generation unit that generates a causal relationship of failure events based on the formulas;
a formula base fault tree generation unit that generates a formula base fault tree that is a combination of the causal relationships of the failure events; and
an output unit that outputs the formula base fault tree;
wherein the formula base fault tree expresses both resulting event and causative event in terms of physical quantities, and
the formula expresses a relationship between a physical quantity of the resulting event and a physical quantity of the causative event.

2. A fault tree generation device comprising:
a formula database that stores formulas related to physical phenomena;
a formula base causal model generation unit that generates a causal relationship of failure events based on the formulas;
a formula base fault tree generation unit that generates a formula base fault tree that is a combination of the causal relationships of the failure events;
an output unit that outputs the formula base fault tree; and
a failure information base causal model combination unit that generates a fault tree by combining a causal relationship extracted from failure information that describes a failure event that actually occurred and a cause of the failure event, with formula base fault tree.

3. The fault tree generation device according to claim 2, the device further comprising:
a score calculation unit that derives a correlation between a resulting event and a causative event of the fault tree from the failure information or from a relationship between an objective variable of the formula and an explanatory variable of the formula, and indicates in any manner a cause that makes the correlation large or small with respect to any reference.

4. A fault tree generation device comprising:
a formula database that stores formulas related to physical phenomena;
a formula base causal model generation unit that generates a causal relationship of failure events based on the formulas;
a formula base fault tree generation unit that generates a formula base fault tree that is a combination of the causal relationships of the failure events; and
an output unit that outputs the formula base fault tree;
wherein the failure event includes a case in which a value of an objective variable of the formula is inappropriate, and
the cause of the failure event includes a case in which a value of an explanatory variable of the formula is inappropriate.

5. The fault tree generation device according to claim 4, wherein the case in which the value of the objective variable of the formula and the value of the explanatory variable of the formula are inappropriate includes a case in which the value of the objective variable of the formula and the value of the explanatory variable of the formula are large or small with respect to any reference.

6. A fault tree generation method comprising:
storing formulas related to physical phenomena by a formula database;
generating a causal relationship of failure event based on the formulas by a formula base causal model generation unit;
generating a formula base fault tree that is a combination of the causal relationships of the failure events by a formula base fault tree generation unit; and
outputting the formula base fault tree by an output device;
wherein the formula base fault tree expresses both resulting event and causative event in terms of physical quantities; and
wherein the formula expresses a relationship between a physical quantity of the resulting event and a physical quantity of the causative event.

* * * * *